US009290061B2

(12) United States Patent
Iwabuchi (10) Patent No.: US 9,290,061 B2
(45) Date of Patent: Mar. 22, 2016

(54) PNEUMATIC TIRE

(75) Inventor: Sotaro Iwabuchi, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 376 days.

(21) Appl. No.: 13/519,480

(22) PCT Filed: Nov. 10, 2010

(86) PCT No.: PCT/JP2010/070046
§ 371 (c)(1),
(2), (4) Date: Jun. 27, 2012

(87) PCT Pub. No.: WO2011/080969
PCT Pub. Date: Jul. 7, 2011

(65) Prior Publication Data
US 2012/0291934 A1    Nov. 22, 2012

(30) Foreign Application Priority Data

Dec. 28, 2009 (JP) ................................. 2009-298524

(51) Int. Cl.
*B60C 11/11*    (2006.01)
*B60C 11/13*    (2006.01)
(Continued)

(52) U.S. Cl.
CPC .............. *B60C 11/12* (2013.01); *B60C 11/033* (2013.04); *B60C 11/0306* (2013.04); *B60C 11/1307* (2013.04); *B60C 11/1323* (2013.04);
(Continued)

(58) Field of Classification Search
CPC   B60C 11/13; B60C 11/1307; B60C 11/1315; B60C 11/1323; B60C 2011/133; B60C 2011/1338; B60C 11/0306
USPC ...................................... 152/209.18
See application file for complete search history.

(56) References Cited

U.S. PATENT DOCUMENTS 5,031,680 A * 7/1991 Kajikawa et al. ......... 152/209.18
5,158,626 A * 10/1992 Himuro ..................... 152/209.28
(Continued)

FOREIGN PATENT DOCUMENTS

EP          0728599    *  8/1996
JP          5-69706 A      3/1993
(Continued)

OTHER PUBLICATIONS

Chinese Office Action, dated Mar. 28, 2014, issued in corresponding Chinese Patent Application No. 201080059514.4.

*Primary Examiner* — Steven D Maki
*Assistant Examiner* — Robert Dye
(74) *Attorney, Agent, or Firm* — Sughrue Mion, PLLC (57) ABSTRACT

An object is to provide a pneumatic tire with enhanced on-snow performance. On-snow performance is enhanced due to a tire 10 having a tread 12 provided with a shoulder circumferential direction main groove 16 formed with alternating narrow groove-width portions 16A and wide groove-width portions 16B having a wider groove-width than the narrow groove-width portions 16A extending in the tire circumferential direction. The tread 12 is further provided with an intermediate lug groove 32, extending in a direction so as to intersect the shoulder circumferential direction main groove 16 and having a first end portion connected to the shoulder circumferential direction main groove 16. The intermediate lug groove 32 is provided such that one of the wide groove-width portions 16B is positioned on an extension line of the intermediate lug groove 32.

3 Claims, 5 Drawing Sheets

(51) Int. Cl.
  *B60C 11/12*  (2006.01)
  *B60C 11/03*  (2006.01)

(52) U.S. Cl.
  CPC . *B60C2011/0348* (2013.04); *B60C 2011/0353* (2013.04); *B60C 2011/0381* (2013.04); *B60C 2011/0383* (2013.04); *B60C 2011/1209* (2013.04); *B60C 2011/1338* (2013.04)

(56) References Cited

U.S. PATENT DOCUMENTS

| | | | |
|---|---|---|---|
| 5,386,861 | A | 2/1995 | Overhoff et al. |
| 7,195,044 | B2 * | 3/2007 | Maxwell et al. ......... 152/209.21 |
| 2008/0156405 | A1 * | 7/2008 | Tanabe ..................... 152/209.18 |
| 2009/0101260 | A1 | 4/2009 | Ikegami |
| 2009/0114324 | A1 * | 5/2009 | Ohki et al. ............... 152/209.23 |
| 2010/0038001 | A1 * | 2/2010 | Yamaguchi .................... 152/153 |
| 2010/0139826 | A1 * | 6/2010 | Matsumoto ............. 152/209.18 |

FOREIGN PATENT DOCUMENTS

| | | |
|---|---|---|
| JP | 5-238211 A | 9/1993 |
| JP | 7-276920 A | 10/1995 |
| JP | 2000-229505 A | 8/2000 |
| JP | 2001-206018 A | 7/2001 |
| JP | 2003-306012 A | 10/2003 |
| JP | 2003-341306 A | 12/2003 |
| JP | 2007-106314 A | 4/2007 |
| JP | 2007-230251 A | 9/2007 |
| JP | 2009-101846 A | 5/2009 |

* cited by examiner

PNEUMATIC TIRE

CROSS REFERENCE TO RELATED APPLICATIONS

This application is a National Stage of International Application No. PCT/JP2010/070046 filed on Nov. 10, 2010, which claims priority from Japanese Patent Application No. 2009-298524, filed on Dec. 28, 2009, the contents of all of which are incorporated herein by reference in their entirety.

TECHNICAL FIELD

The present invention relates to a pneumatic tire suitable for all-season use and having enhanced on-snow performance.

BACKGROUND ART

A pneumatic tire having enhanced performance on wet road surfaces or snow, whilst maintaining excellent performance on dry road surfaces is disclosed in Patent Document 1. In Patent Document 1 a tread is formed with lug grooves that extend from a tread edge side and continue as far as a central land portion on the tire width direction central side, with the angled direction of the lug grooves reversing and the lug grooves terminating inside the central land portion. The lug grooves contribute to the groove component in the tire width direction and the groove component in the tire circumferential direction of the central land portion, thereby improving the performance on snow.

Patent Document 1: Japanese Patent Application Laid-Open No. 2007-230251.

DISCLOSURE OF INVENTION

Technical Problem

However, further improvements to on-snow performance are demanded by the market.

The present invention addresses the above issue, and an object of the present invention is to provide a pneumatic tire with enhanced on-snow performance.

Solution to Problem

A pneumatic tire of a first aspect includes: a first circumferential direction groove provided to a tread, extending in the tire circumferential direction and formed with alternating narrow groove-width portions and wide groove-width portions having a wider groove-width than the narrow groove-width portions; and a first intersecting groove provided to the tread, extending in a direction so as to intersect the first circumferential direction groove and having a first end portion connected to the first circumferential direction groove, with the first intersecting groove provided such that one of the wide groove-width portions is positioned on an extension line of the first intersecting groove.

In the pneumatic tire of the first aspect, snow that enters into the first circumferential direction groove when traveling on a snowy road surface is compacted together to form snow columns. Sideways slippage of the tire when traveling on a snowy road surface is suppressed by the shear force of the snow columns.

The snow columns formed in the wide groove-width portions of the first circumferential direction groove when traveling on a snowy road surface become lodged in the steps between the wide groove-width portions and the narrow groove-width portions since the wide groove-width portions are wider than the narrow groove-width portions. What is referred to as the on-snow performance, such as the traction performance and the braking performance when traveling on a snowy road surface, is enhanced by the shear force of the snow columns.

Snow that has entered the wide groove-width portions of the first circumferential direction grooves and the first intersecting grooves is compacted together, due to the wide groove-width portion of the first circumferential direction groove being positioned on an extension line of the first intersecting groove, forming a snow column that straddles the wide groove-width portion and the first intersecting groove. On-snow performance when traveling on a snowy road surface is accordingly further enhanced by the shear force of such integrally formed snow columns.

A pneumatic tire of a second aspect is the pneumatic tire of the first aspect further including a second intersecting groove provided to the tread on the opposite side of the first circumferential direction groove to the first intersecting groove, the second intersecting groove extending in a direction so as to intersect the first circumferential direction groove and having a first end portion connected to the first circumferential direction groove, with the second intersecting groove provided such that one of the wide groove-width-portions is positioned on an extension line of the second intersecting groove.

In the pneumatic tire of the second aspect, snow that has entered the wide groove-width portions of the first circumferential direction groove, the first intersecting grooves and the second intersecting grooves is compacted together, due to the wide groove-width portion of the first circumferential direction groove being positioned on an extension line of the second intersecting groove, forming an integral snow column straddling across the wide groove-width portion, the first intersecting groove and the second intersecting groove. On-snow performance when traveling on a snowy road surface is further enhanced by the shear force of such integrally formed snow columns.

A pneumatic tire of a third aspect is the pneumatic tire of the first aspect or wherein the first circumferential direction groove is formed on the tread edge side of a region between the tire equatorial plane and the tread edge.

In a pneumatic tire of the third aspect, a reduction in rigidity at the tire equatorial plane side is suppressed in comparison to cases in which the first circumferential direction groove is formed on the tire equatorial plane side of the region between the tire equatorial plane and the tread edge by forming the first circumferential direction groove on the tread edge side of this region. A reduction in driving stability performance can accordingly be suppressed.

A pneumatic tire of a fourth aspect is the pneumatic tire of the third aspect, further including a pair of second circumferential direction grooves extending in the tire circumferential direction provided to the tread one on each side of the tire equatorial plane further towards the tire equatorial plane than the first circumferential direction groove. Central groove(s) are provided to a central land portion formed between the pair of second circumferential direction grooves, the central groove(s) extending in a direction so as to intersect the second circumferential direction grooves with the two end portions of the central groove(s) respectively connected to each of the pair of second circumferential direction grooves and with a groove-width at a first end portion side of the central groove(s) that differs from the groove-width at the second end portion side.

In the pneumatic tire of the fourth aspect, on-snow performance is further enhanced by the shear force of snow columns that are formed in the central groove(s) when traveling on a snowy road surface.

Snow readily enters the wide groove-width side of the central groove(s), due to the first end portion side and the second end portion side of the central groove(s) having different groove-widths, thereby contributing to on-snow performance. The narrow groove-width sides of the central groove(s) suppress a reduction in rigidity of the central land portion, and contribute to driving stability performance.

Basic water discharge performance is secured by forming the tread with the plural grooves extending in the tire circumferential direction and the plural grooves that intersect with and are connected to the grooves extending in the tire circumferential direction. Due to the above configurations, on-snow performance can accordingly be enhanced whilst securing basic driving performance (driving stability performance, water discharge performance) on dry and wet road surfaces.

A pneumatic tire of a fifth aspect is the pneumatic tire of the fourth aspect, wherein the central grooves include first central grooves having a groove-width at a first end portion side that is wider than the groove-width at the second end portion side, and second central grooves having a groove-width at the first end portion side that is narrower than the groove-width at the second end portion side. The first central grooves and the second central grooves are disposed alternately along the tire circumferential direction.

In the pneumatic tire of the fifth aspect, when travelling on a snowy road surface, snow readily enters the first end portion side of the first central grooves having a wide groove-width, and the second end portions side of the second central grooves having a wide groove-width. Snow columns are consequently formed with good balance at the first end portion side of the first central grooves and the second end portion side of the second central grooves, thereby enhancing traction performance and braking performance when traveling on a snowy road surface, as well as enhancing driving stability performance.

A pneumatic tire of a sixth aspect is the pneumatic tire of the fourth aspect wherein the central grooves are angled with respect to the tire width direction.

In the pneumatic tire of the sixth aspect, due to angling the central grooves with respect to the tire width direction, the edge length of the central grooves becomes longer than in cases in which the central grooves are orientated along the tire width direction, and a circumferential direction edge component and a width direction edge component are both obtained. The edge effect exhibited by the central grooves enables sideways slippage when traveling on an icy and snowy road surface to be suppressed as well as enhancing traction performance and braking performance.

Advantageous Effects of Invention

As explained above, the pneumatic tire of the present invention can enhance on-snow performance.

BEST MODE FOR CARRYING OUT THE INVENTION

First Exemplary Embodiment

Explanation is given of a pneumatic tire of a first exemplary embodiment of the present invention, with reference to FIG. 1 to FIG. 4. Note that any known internal structure may be applied for the internal structure of the pneumatic tire of the present exemplary embodiment, and therefore explanation is omitted thereof Accordingly, explanation follows regarding a tread pattern of the pneumatic tire of the first exemplary embodiment.

Figure 1:
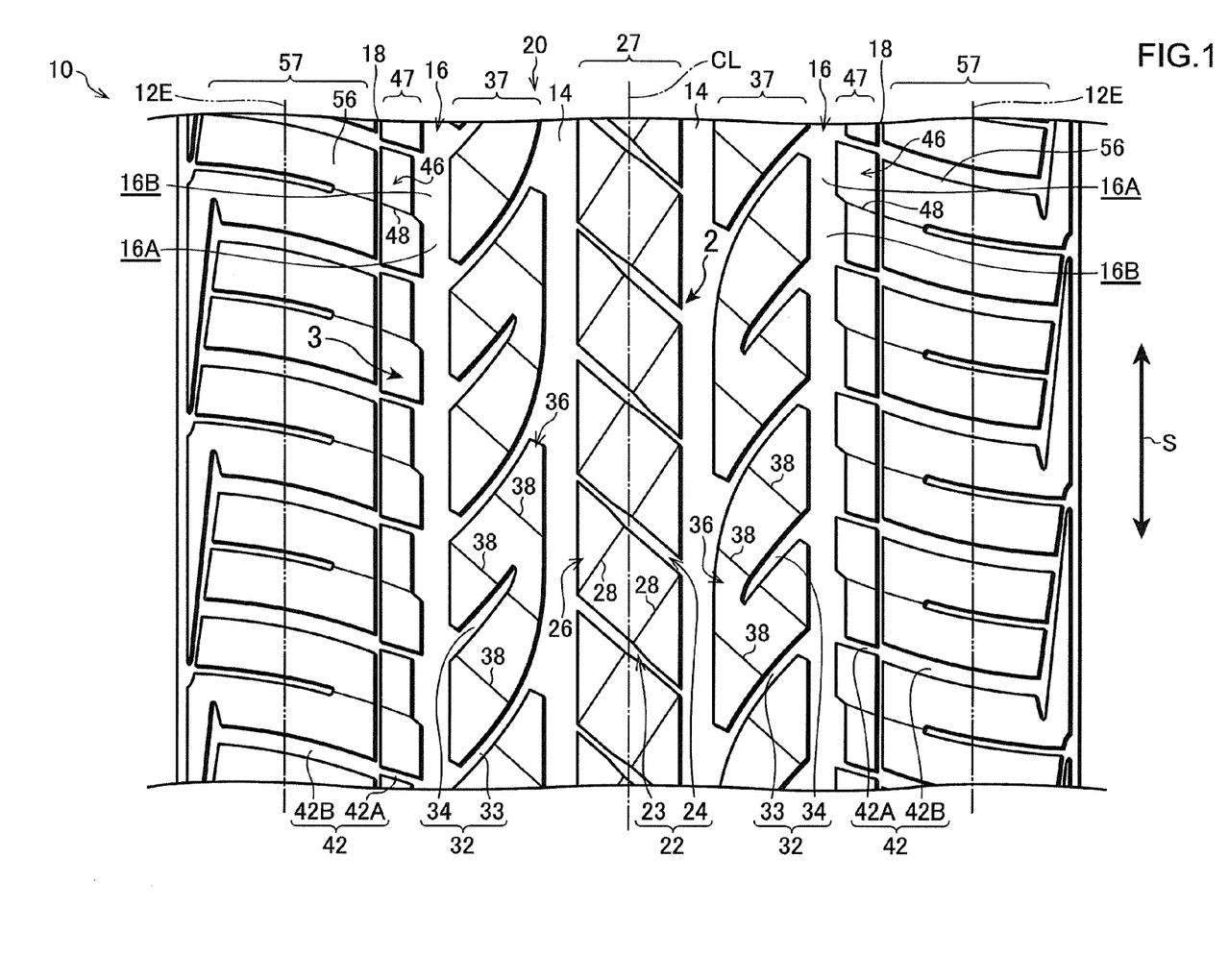
FIG. 1 is a plan view of a pneumatic tire of a first exemplary embodiment of the present invention.

As shown in FIG. 1, a tread 12 of a pneumatic tire 10 (referred to below simply as tire 10) is formed including: a pair of central circumferential direction main grooves 14 that extend along the tire circumferential direction on both tire width direction outsides, with a tire equatorial plane CL interposed therebetween; a pair of shoulder circumferential direction main grooves 16 that extend along the tire circumferential direction further to the tire width direction outsides than the central circumferential direction main grooves 14; and a pair of shoulder circumferential direction fine grooves 18 that extend along the tire circumferential direction further to the tire width direction outsides than the pair of shoulder circumferential direction main grooves 16. Note that the shoulder circumferential direction main grooves 16 are an example of first circumferential direction grooves, and the central circumferential direction main grooves 14 are an example of second circumferential direction grooves.

Each of the shoulder circumferential direction main grooves 16 is disposed at the tread edge 12E side of a region between a tread edge 12E and the tire equatorial plane CL. The tread edge referred to here indicates the tire width direction outermost ground contact portion when the pneumatic tire is mounted to a standard rim, as defined in the JATMA YEAR BOOK (2009 edition, Japan Automobile Tire Manufacturers Association standards), inflated to an internal pressure of 100% of the pressure (maximum pressure) corresponding to maximum load capability (load shown in bold type in the internal pressure—load capability chart) in the JATMA YEAR BOOK for the applicable size/ply rating, and loaded to the maximum load capability when the tire is in a motionless state and perpendicular with respect to a flat plane. Where the location of use or manufacturing location uses TRA standards or ETRTO standards then these respective standards are applied.

The shoulder circumferential direction main grooves 16 are formed with narrow groove-width portions 16A and wide groove-width portions 16B that are wider in groove-width than the narrow groove-width portions 16A, with the narrow groove-width portions 16A and the wide groove-width portions 16B alternating along the tire circumferential direction. The narrow groove-width portions 16A and the wide groove-width portions 16B have respective substantially constant groove-widths, with steps 16C formed at the boundaries of the wide groove-width portions 16B and the narrow groove-width portions 16A.

Figure 2:
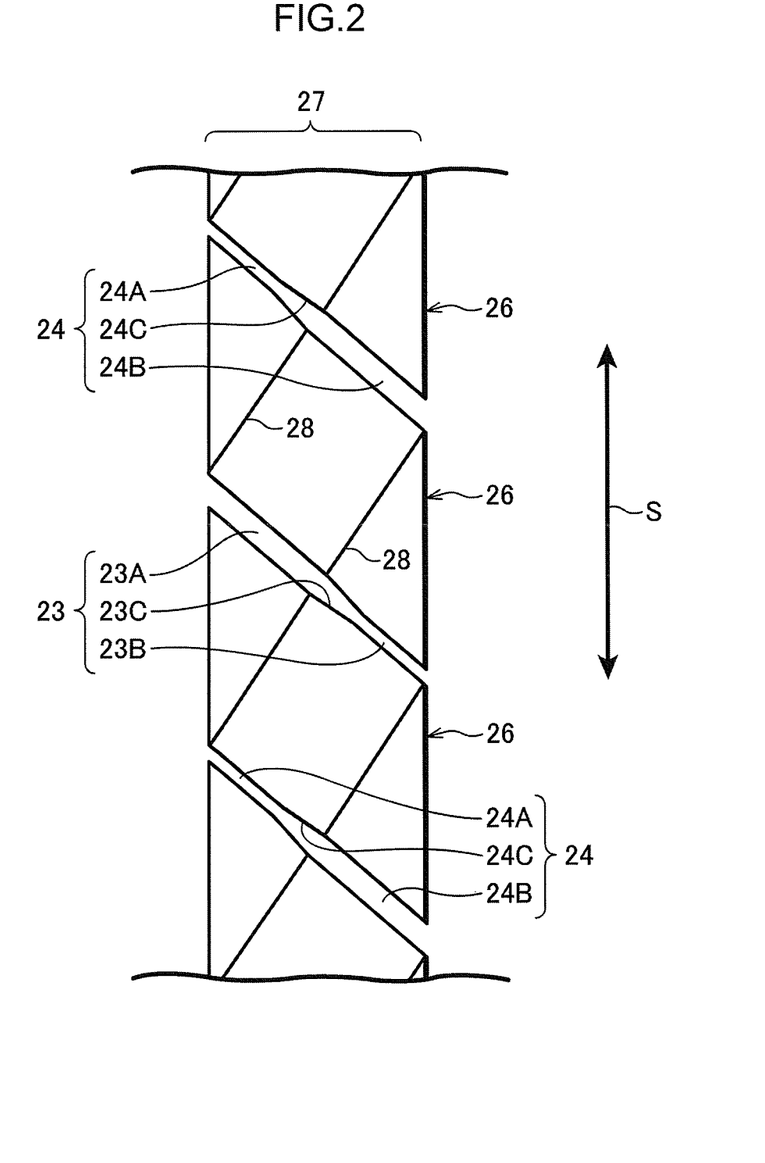
FIG. 2 is an enlargement of a second portion of FIG. 1.

As shown in FIG. 1 and FIG. 2, the tread 12 is also formed with central lug grooves 22 that extend from a first of the central circumferential direction main grooves 14 to the other of the central circumferential direction main grooves 14. The two end portions of the central lug grooves 22 are connected to the pair of central circumferential direction main grooves 14, with a first of the end portions having a different groove-width to the second end portion. Each of the central lug grooves 22 is configured from a first central lug groove 23 and a second central lug groove 24, and the first central lug grooves 23 and the second central lug grooves 24 are disposed alternately to each other along the tire circumferential direction.

The first central lug grooves 23 and the second central lug grooves 24 extend respectively in a direction that intersects with the central circumferential direction main grooves 14. Note that in the present exemplary embodiment, the first central lug grooves 23 and the second central lug grooves 24 extend in the same direction as each other. However there is no limitation thereto, and the first central lug grooves 23 and the second central lug grooves 24 may also extend in directions that intersect with each other.

The first central lug grooves 23 are configured with a first end portion side groove-width wider than the second end portion side groove-width. In the following the wider of the groove-width portions, at the first end portion side of the first central lug grooves 23, are referred to as central wide groove-width portions 23A, and the portions with a narrower groove-width than the central wide groove-width portions 23A, at the second end portion side, are referred to as central narrow groove-width portions 23B. The central wide groove-width portions 23A and central narrow groove-width portions 23B respectively have substantially constant groove-widths, and steps 23C are formed at the boundaries of the central wide groove-width portions 23A and the central narrow groove-width portions 23B.

The second central lug grooves 24 are configured such that the groove-width at the first end portion side is narrower than the groove-width at the second end portion side. In the following the narrower of the groove-width portions, at the first end portion side of the second central lug grooves 24, are referred to as central narrow groove-width portions 24A, and the portions with a wider groove-width than the central narrow groove-width portions 24A, at the second end portion side, are referred to as central wide groove-width portions 24B. The central narrow groove-width portions 24A and the central wide groove-width portions 24B respectively have substantially constant groove-widths, and steps 24C are formed at the boundaries of the central narrow groove-width portions 24A and the central wide groove-width portions 24B.

The tread 12 is further formed with central land portions 26 that are demarcated by the pair of central circumferential direction main grooves 14, the first central lug grooves 23, and the second central lug grooves 24. Plural of the central land portions 26 are arrayed along the tire circumferential direction to form a central land portion chain 27.

The central land portions 26 are formed with plural sipes 28 angled in an opposite direction to the first central lug grooves 23 and the second central lug grooves 24. The sipes 28 divide the road surface side of the central land portions 26 into plural segments. The sipes 28 are further set with a groove-width such that they close up on road surface contact.

Figure 3:
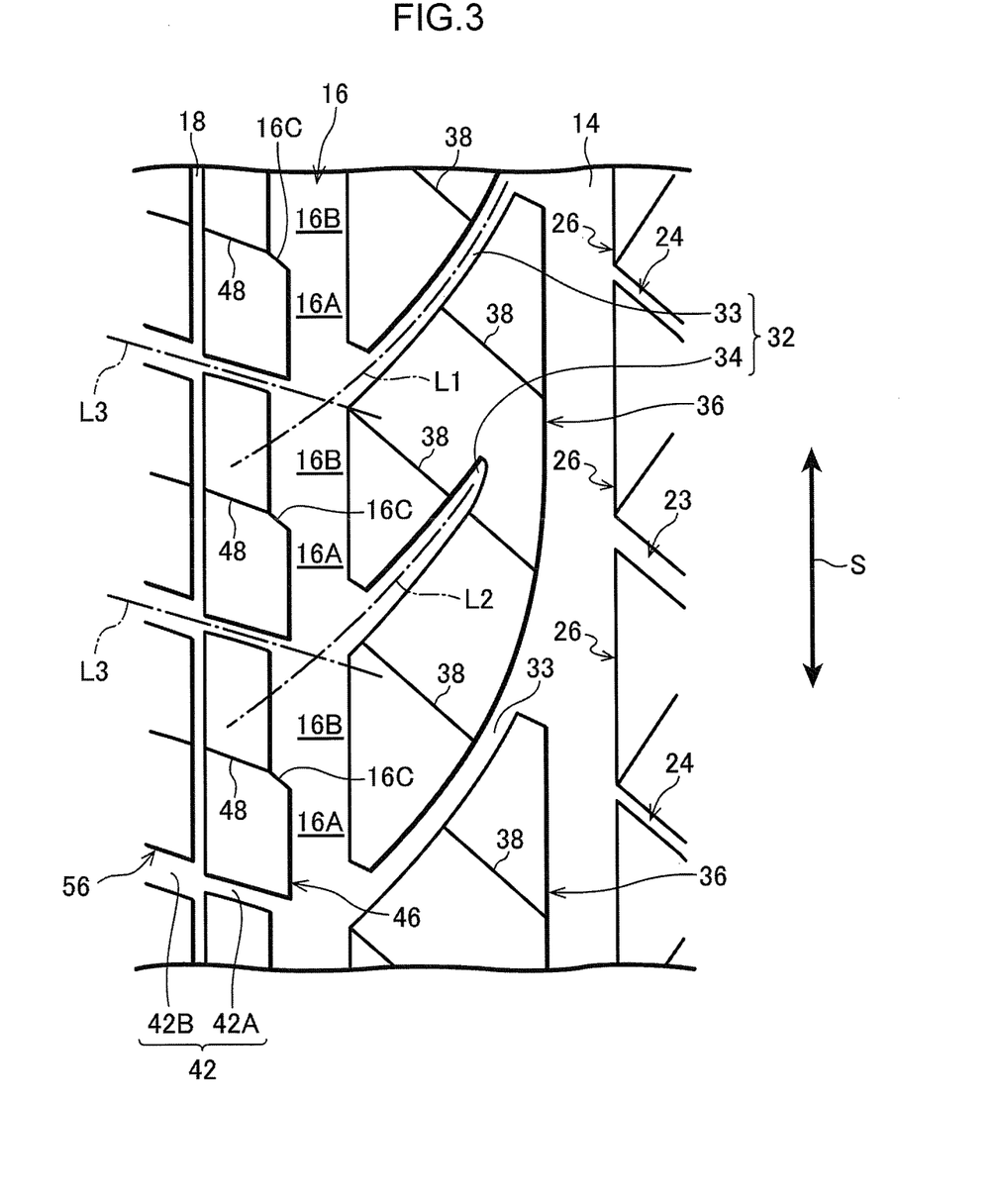
FIG. 3 is an enlargement of a third portion of FIG. 1.

As shown in FIG. 1 and FIG. 3, the tread 12 is formed with intermediate lug grooves 32 that extend from the shoulder circumferential direction main grooves 16 towards the central circumferential direction main groove 14 sides, and serving as examples of first intersecting grooves. The intermediate lug grooves 32 are configured from first intermediate lug grooves 33 and second intermediate lug grooves 34, and the first intermediate lug grooves 33 and the second intermediate lug grooves 34 are disposed alternately in the tire circumferential direction.

The first intermediate lug grooves 33 and the second intermediate lug grooves 34 respectively extend in curving directions intersecting with the shoulder circumferential direction main grooves 16. Note that while in the present exemplary embodiment the first intermediate lug grooves 33 and second intermediate lug grooves 34 extend in a curve, there is no limitation thereto and they may also extend in a straight line form.

In the present exemplary embodiment, the first intermediate lug grooves 33 and the second intermediate lug grooves 34 also extend in the same direction as each other. However there is no limitation thereto and the first intermediate lug grooves 33 and second intermediate lug grooves 34 may also extend in directions that intersect each other.

A first end portion of each of the first intermediate lug grooves 33 is connected to the shoulder circumferential direction main grooves 16 and the second end is connected to the central circumferential direction main grooves 14.

A first end portion of each of the second intermediate lug grooves 34 is connected to the shoulder circumferential direction main grooves 16, however the second end portion is not connected to the central circumferential direction main grooves 14. In other words, the second end portions of the second intermediate lug grooves 34 terminate inside intermediate land portions 36 that are demarcated by the central circumferential direction main grooves 14, the shoulder circumferential direction main grooves 16, and the first intermediate lug grooves 33. Any reduction to the rigidity of the intermediate land portions 36 is accordingly suppressed more than in cases in which the second intermediate lug grooves 34 do not terminate inside the intermediate land portions 36 and are connected to the central circumferential direction main grooves 14. Note that plural of the intermediate land portions 36 are arrayed along the tire circumferential direction to form an intermediate land portion chain 37.

The intermediate land portions 36 are configured with a substantially parallelogram shape when viewing the tread face-on, with the acute angled corner portions chamfered. The rigidity of the chamfered corners of the intermediate land portions 36 is accordingly increased, and defects to the corners of the intermediate land portions 36 are suppressed from occurring.

The intermediate land portions 36 are formed with plural sipes 38 angled in an opposite direction to the first intermediate lug grooves 33 and second intermediate lug grooves 34. The sipes 38 divide the road surface side of the intermediate land portions 36 into plural segments. The sipes 38 are also set with a groove-width such that they close up on road surface contact.

As shown in FIG. 1 and FIG. 3, the tread 12 is formed with shoulder lug grooves 42 that extend from the shoulder circumferential direction main grooves 16 to the tread edge 12E, intersecting with the shoulder circumferential direction fine grooves 18 and serving as examples of second intersecting grooves. The shoulder lug grooves 42 extend while curving in a direction that intersects with the shoulder circumferential direction main grooves 16. Note that while in the present exemplary embodiment, the shoulder lug grooves 42 extend in a curve, there is no limitation thereto, and they may also extend in a straight line form.

The shoulder lug grooves 42 are each further configured from a shoulder lug narrow groove portion 42A that extends from the shoulder circumferential direction main grooves 16 to the shoulder circumferential direction fine grooves 18, and a shoulder lug wide groove portion 42B that extends from the shoulder lug narrow groove portion 42A towards the tread edge 12E side. The shoulder lug wide groove portions 42B are configured with a wider groove-width than the shoulder lug narrow groove portions 42A.

The tread 12 is formed with first shoulder land portions 46 that are demarcated by the shoulder circumferential direction main grooves 16, the shoulder circumferential direction fine grooves 18, and the shoulder lug narrow groove portions 42A. Plural of the first shoulder land portions 46 are arrayed along the tire circumferential direction to form a first shoulder land portion chain 47.

The tread 12 is also formed with second shoulder land portions 56 that are demarcated by the shoulder circumferential direction fine grooves 18, and the shoulder lug wide groove portions 42B. Plural of the second shoulder land portions 56 are arrayed along the tire circumferential direction to form a second shoulder land portion chain 57.

The first shoulder land portions 46 and the second shoulder land portions 56 are each formed with a sipe 48 that extends in the same direction as the direction of the shoulder lug grooves 42. The sipes 48 straddle across from the first shoulder land portions 46 into the second shoulder land portions 56, dividing the road surface side of both portions. The sipes 48 are further set with a groove-width such that they close up on road surface contact.

As shown in FIG. 3, the wide groove-width portions 16B of the shoulder circumferential direction main grooves 16 are respectively disposed on extension lines L3 of the shoulder lug grooves 42. The wide groove-width portions 16B of the shoulder circumferential direction main grooves 16 are also respectively disposed on extension lines L1 of the first intermediate lug grooves 33 and extension lines L2 of the second intermediate lug grooves 34 that are disposed alternately along the tire circumferential direction. Namely, the first intermediate lug grooves 33 and the shoulder lug grooves 42 are connected together through given alternate wide groove-width portions 16B of the shoulder circumferential direction main grooves 16, and the second intermediate lug grooves 34 and the shoulder lug grooves 42 are connected together through the following wide groove-width portions 16B (the neighboring wide groove-width portion 16B in the tire circumferential direction).

Note that as shown in FIG. 1, in the tire 10 of the present exemplary embodiment the tread pattern on a first side of the tire as divided by the tire equatorial plane CL has point symmetry with the tread pattern on the second side thereof.

Explanation next follows regarding the operation and advantageous effects of the tire 10 of the present exemplary embodiment.

Figure 4A:
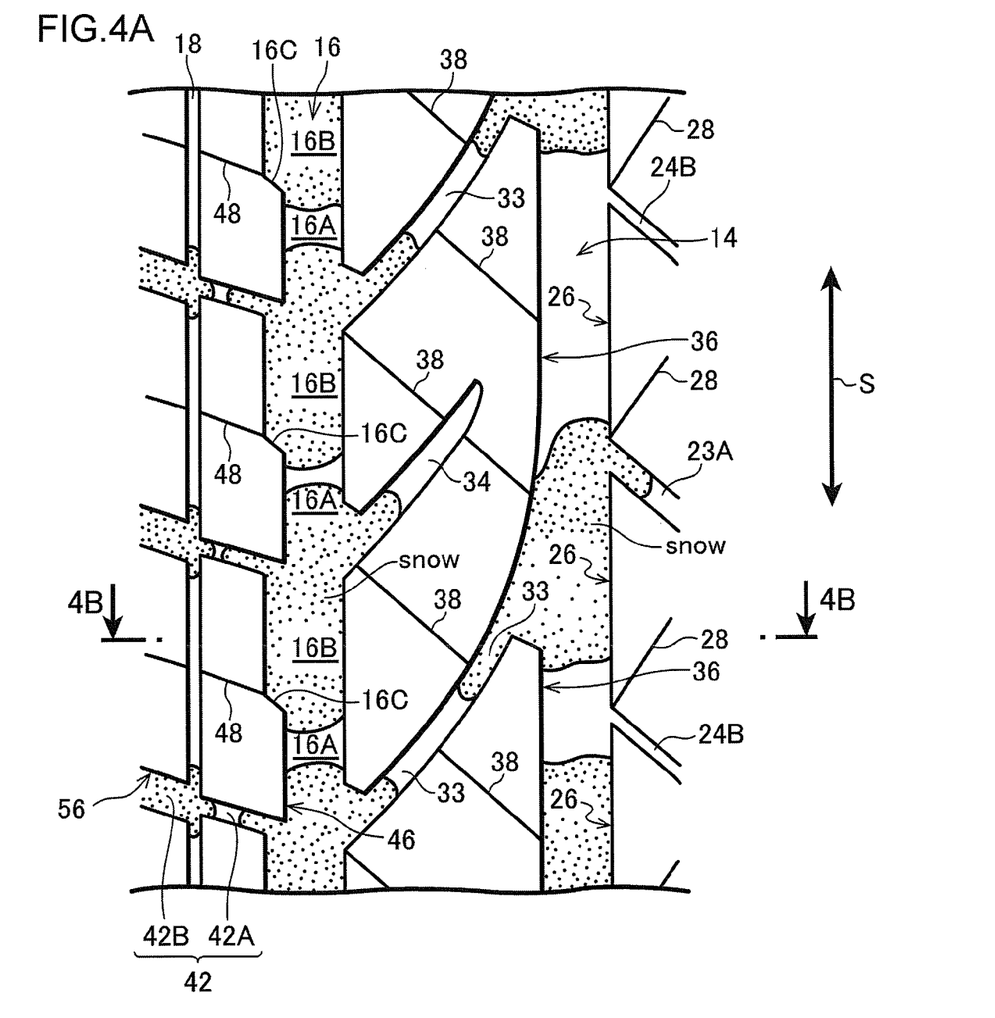
FIG. 4A is an enlarged plan view of a pneumatic tire, illustrating trapped snow formed by the pneumatic tire of the first exemplary embodiment running on a snowy road surface.
Figure 4B:
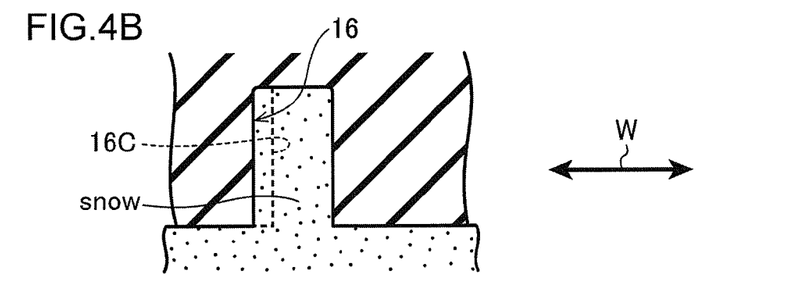
FIG. 4B is a cross-section taken along line 4B-4B of FIG. 4A.

As shown in FIG. 4A and FIG. 4B, when traveling on a snowy road surface, snow on the road surface enters the pair of central circumferential direction main grooves 14 and the pair of shoulder circumferential direction main grooves 16 respectively, forming plural snow columns as the snow that has entered is compacted together. Sideways slippage of the tire 10 when traveling on a snowy road surface is accordingly suppressed by the shear force of the snow columns.

When traveling on a snowy road surface, the snow columns formed in the wide groove-width portions 16B of the shoulder circumferential direction main grooves 16 also lodge behind the steps 16C during travel or braking, since the columns are wider than the narrow groove-width portions 16A. The so-called on-snow performance of the traction performance and braking performance when traveling on a snowy road surface is enhanced by the shear force of the snow columns formed in the wide groove-width portions 16B.

It is easier for snow on a road surface to enter into portions with a wide groove-width than portions with a narrow groove-width, and snow can also readily enter into portions where grooves intersect with each other.

Snow consequently more readily enters the wide groove-width portions 16B of the shoulder circumferential direction main grooves 16 disposed on the extension lines L1 of the first intermediate lug grooves 33 and the extension lines L3 of the shoulder lug grooves 42, and snow columns are more readily formed therein than at the narrow groove-width portions 16A of the shoulder circumferential direction main grooves 16. Namely, this is due to the wide groove-width portions 16B being located at intersecting portions of the shoulder circumferential direction main grooves 16, the first intermediate lug grooves 33 and the shoulder lug grooves 42.

Snow likewise more readily enters the following wide groove-width portions 16B of the shoulder circumferential direction main grooves 16 disposed on the extension lines L2 of the second intermediate lug grooves 34 and the extension lines L3 of the shoulder lug grooves 42 and snow columns are more readily formed therein than at the narrow groove-width portions 16A of the shoulder circumferential direction main grooves 16. Namely, this is due to the following wide groove-width portions 16B being located at intersecting portions of the shoulder circumferential direction main grooves 16, the second intermediate lug grooves 34 and the shoulder lug grooves 42.

As shown in FIG. 4A, when traveling on a snowy road surface, snow that has entered the first intermediate lug grooves 33, the wide groove-width portions 16B and the shoulder lug grooves 42 is compacted together, and integral snow columns are formed that straddle across the first intermediate lug grooves 33, the wide groove-width portions 16B and the shoulder lug grooves 42. Snow that has entered the second intermediate lug grooves 34, the wide groove-width portions 16B and the shoulder lug grooves 42 is also compacted together, and integral snow columns are formed that straddle across the second intermediate lug grooves 34, the wide groove-width portions 16B and the shoulder lug grooves 42. Such integrally formed snow columns become lodged in the groove walls of the first intermediate lug grooves 33, the groove walls of the shoulder lug grooves 42, and the steps 16C when traveling or braking on a snowy road surface. The on-snow performance when traveling on a snowy road surface is accordingly enhanced by the shear force of these integrally formed snow columns.

Any reduction in rigidity at the tire equatorial plane CL side is suppressed due to the groove-width of the central circumferential direction main grooves 14 being substantially constant, compared to cases in which the groove-width of the central circumferential direction main grooves 14 varies in an alternating pattern along the tire circumferential direction. A reduction in driving stability performance is accordingly suppressed.

The first central lug grooves 23 are each configured from a central wide groove-width portion 23A and a central narrow groove-width portion 23B, and the second central lug grooves 24 are each configured from a central narrow groove-width portion 24A and a central wide groove-width portion 24B. A larger amount of snow can accordingly enter the central wide groove-width portions 23A and central wide groove-width portions 24B that in cases in which the central lug grooves 22 are configured with substantially constant groove-width. The rigidity of the central land portions 26 can also be secured at the central narrow groove-width portion 23B sides and the central narrow groove-width portion 24A sides. Rigidity at the tire width direction central side is thereby secured, and driving stability performance is also secured.

Snow can also readily enter intersecting portions of the central wide groove-width portions 23A of the first central lug grooves 23 and the central circumferential direction main grooves 14, and intersecting portions of the central wide groove-width portions 24B of the second central lug grooves 24 and the central circumferential direction main grooves 14. Therefore, when traveling on a snowy road surface, snow enters and is formed into integral snow columns at intersecting portions of the central wide groove-width portions 23A and the central circumferential direction main grooves 14, and snow also enters and is formed into integral snow columns at intersection portions of the central wide groove-width portions 24B and the central circumferential direction main grooves 14. These integrally formed snow columns hence not only enhance traction performance and braking performance when travelling on a snowy road surface, but also improve driving stability performance due to being formed with good balance at both sides of the central land portion chain 27.

The respective edge lengths of the first central lug grooves 23 and the second central lug grooves 24 are lengthened when they are angled with respect to the tire width direction, and both a circumferential direction edge component and a width direction edge component can be obtained by angling the first central lug grooves 23 and the second central lug grooves 24. Sideways slippage can accordingly be suppressed when traveling on an icy and snowy road surface together with obtaining an increase in traction performance and braking performance as a result of the edge effect of the first central lug grooves 23 and the second central lug grooves 24.

In contrast, traction performance and braking performance when traveling on an icy and snowy road surface can be efficiently exhibited when the first central lug grooves 23 and the second central lug grooves 24 are orientated along the tire width direction so as to maximize the circumferential direction edge component.

The plural sipes 28 are formed to the central land portions 26, the plural sipes 38 are formed to the intermediate land portions 36, and the plural sipes 48 are formed so as to straddle across the first shoulder land portions 46 and the second shoulder land portions 56. Performance on ice and snow can consequently be enhanced on icy and snowy surfaces due to the edge effect and the water suctioning effect exhibited by each of the sipes 28, 38, 48.

Basic water discharge performance can also be secured in the tread 12 by forming the pair of central circumferential direction main grooves 14, the pair of shoulder circumferential direction main grooves 16 and the pair of shoulder circumferential direction fine grooves 18 as grooves extending in the tire circumferential direction, and by forming the central lug grooves 22, the intermediate lug grooves 32, and the shoulder lug grooves 42 so as to intersect (or connect with) these grooves.

The configuration described above enables on-snow performance to be enhanced, whilst securing basic wet and dry traveling performance (driving stability performance, water discharge performance). That is to say, the tire 10 exhibits performance appropriate for an all-season tire.

Other Experimental Embodiments

In the first exemplary embodiment, the shoulder circumferential direction main grooves 16 are configured such that the narrow groove-width portions 16A and the wide groove-width portions 16B are formed alternately to each other along the tire circumferential direction. The present invention is however not limited thereto, and the central circumferential direction main grooves 14 may also be configured so as to have narrow groove-width portions and wide groove-width portions formed alternately to each other along the tire circumferential direction.

In the first exemplary embodiment, configuration is made such that the shoulder circumferential direction main grooves 16 are formed on both sides of the tire equatorial plane CL of the tread 12. The present invention is however not limited thereto, and configuration may be made such that a shoulder circumferential direction main groove 16 is only formed to one side of the tread 12.

Explanation has been given above regarding experimental embodiments of the present invention, however the exemplary embodiments described are merely examples thereof, and various changes may be implemented within a scope not departing from the spirit of the present invention. Obviously the scope of rights claimed by the present invention is not limited to the experimental embodiments here described.

TEST EXAMPLE

The following evaluation is performed employing a first type of tire to which the present invention is applied (Example) and two types of tire to which the present invention is not applied (Comparative Examples) in order to verify the advantageous effects of the present invention.

Sample Test Tires

Example 1

A tire having the structure of the first exemplary embodiment (see FIG. 1). Note that the negative ratio of the tire of Example 1 is 34.2%.

Comparative Example 1

Figure 5:
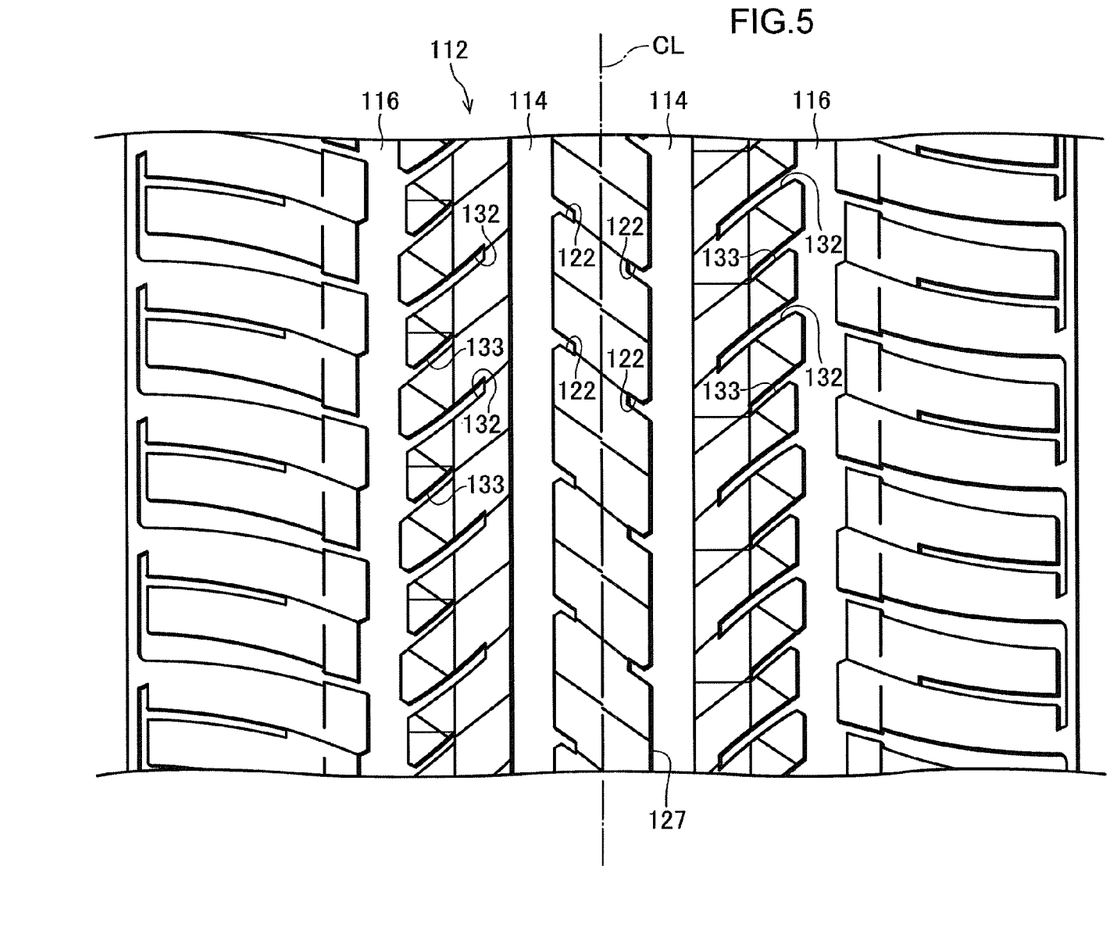
FIG. 5 is a plan view of a tire of a comparative example.

The tire illustrated in FIG. 5. A tread 112 is formed with a pair of shoulder circumferential direction main grooves 116 extending along the tire circumferential direction in a zigzag form, with one on either side in the tire width direction. The tread 112 is also formed with a pair of central circumferential direction main grooves 114 formed further towards the tire equatorial plane CL than the pair of shoulder circumferential direction main grooves 116. Long intermediate lug grooves 132 and short intermediate lug grooves 133 that extend from the shoulder circumferential direction main grooves 116 towards the central circumferential direction main grooves 114 are also formed alternately to each other along the tire circumferential direction. A central land portion 127 formed by the pair of central circumferential direction main grooves 114 is also formed on both sides with central lug grooves 122 that extend towards the tire equatorial plane CL side, and terminate before reaching the tire equatorial plane CL. Note that the negative ratio of the tire of the comparative example 1 is 33.2%.

Comparative Example 2

The tire of the first comparative example, wherein the narrow groove-width portions 16A and the wide groove-width portions 16B are not formed to the shoulder circumferential direction main grooves 16, and the shoulder circumferential direction main grooves 16 have a straight form (constant width). Note that the negative ratio of the tire of the Comparative Example 2 is 34.1%.

Test Conditions

On-snow Traction Performance: An acceleration time is measured to reach a distance of 50 m from start on a road surface of compacted. Evaluation is displayed as an index wherein the reciprocal of the acceleration time of the Comparative Example 1 is taken to be 100. Note that higher values in the index represent better performance.

TABLE 1

|  | Comparative Example 1 | Comparative Example 2 | Example 1 |
|---|---|---|---|
| On-snow Performance (Traction Performance) | 100 | 94 | 106 |

It can be seen from the results in Table 1 that the on-snow performance (traction performance) of the Example 1 is better than that of Comparative Examples 1 and 2. In particular, in the Comparative Example 2 with straight form shoulder circumferential direction main grooves, snow falls out in the circumferential direction and is not compacted together into snow columns, leading to a decrease in on-snow performance. However, compared to the Comparative Example 2, the on-snow performance (traction performance) is greatly enhanced in the Example 1 with shoulder circumferential direction main grooves configured with wide groove-width portions and narrow groove-width portions.

The invention claimed is:

1. A pneumatic tire comprising:
   a first circumferential direction groove provided to a tread, extending in the tire circumferential direction and formed with alternating narrow groove-width portions and wide groove-width portions having a wider groove-width than the narrow groove-width portions;
   a second circumferential direction groove extending in the tire circumferential direction and provided further towards the tire equatorial plane of the tread than the first circumferential direction groove;
   a plurality of first intermediate lug grooves provided to the tread, each of the plurality of first intermediate lug grooves extending in a direction so as to intersect the first circumferential direction groove and having a first end portion connected to the first circumferential direction groove, and a second end portion connected to the second circumferential direction groove with the plurality of first intermediate lug grooves provided such that one of the wide groove-width portions is positioned on an extension line of each of the plurality of first intermediate lug grooves;
   a plurality of second intermediate lug grooves provided to the tread, alternatively to the plurality of first intermediate lug grooves in the tire circumferential direction, each of the plurality of second intermediate lug grooves extending in a direction so as to intersect the first circumferential direction groove and having a first end portion connected to the first circumferential direction groove, and a second end portion terminating inside intermediate land portions that are demarcated by the first circumferential direction groove, the second circumferential direction groove, and first intermediate lug groove, with the plurality of second intermediate lug grooves provided such that one of the wide groove-width portions is positioned on an extension line of each of the plurality of second intermediate lug grooves;
   another second circumferential direction groove, thereby forming a pair of second circumferential direction grooves provided to the tread one on each side of the tire equatorial plane; and
   central groove(s) provided to a central land portion between the pair of second circumferential direction grooves, the central groove(s) extending in a direction so as to intersect the second circumferential direction grooves with the two end portions of the central groove(s) respectively connected to each of the pair of second circumferential direction grooves and with a groove-width at a first end portion side of the central groove(s) that differs from the groove-width at the second end portion side,
   wherein a step portion is formed in the first circumferential direction groove from each of the wide groove-width portions to each of the narrow groove-width portions in a predetermined tire circumferential direction, wherein a width from a first groove wall of the first circumferential direction groove to a second groove wall of the first circumferential direction groove in a tire width direction decreases in the step portion along the predetermined tire circumferential direction,
   wherein the second groove wall of the first circumferential direction groove is a groove wall of a shoulder land portion, and
   wherein the first circumferential direction groove is formed on the tread edge side of a region between the tire equatorial plane and the tread edge.

2. The pneumatic tire of claim 1 wherein:
   the central grooves comprise first central grooves having a groove-width at a first end portion side that is wider than the groove-width at the second end portion side, and second central grooves having a groove-width at the first end portion side that is narrower than the groove-width at the second end portion side; and
   the first central grooves and the second central grooves are disposed alternately along the tire circumferential direction.

3. The pneumatic tire of claim 1 wherein the central grooves are angled with respect to the tire width direction.

* * * * *